Sept. 2, 1941.　　G. W. ROSENBERGER　　2,254,912
WATT-HOUR DEMAND METER
Filed Aug. 14, 1937
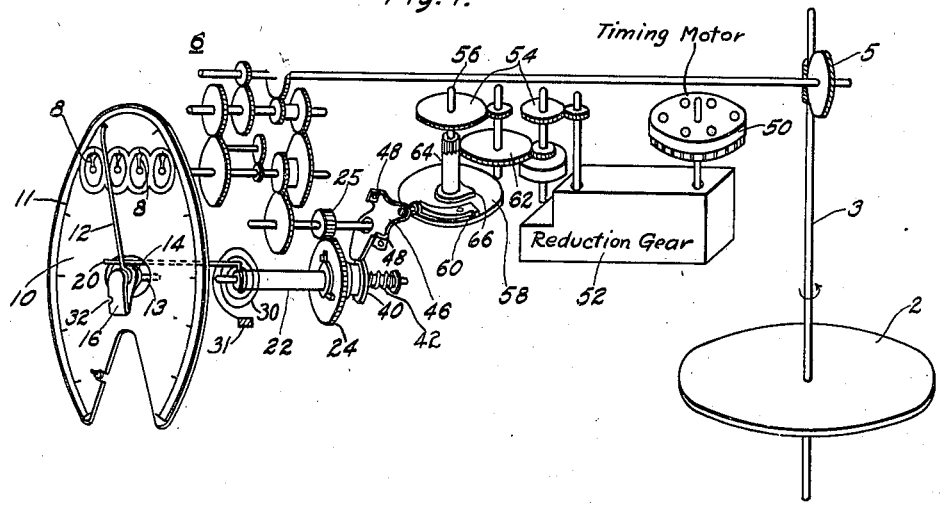
Fig. 1.
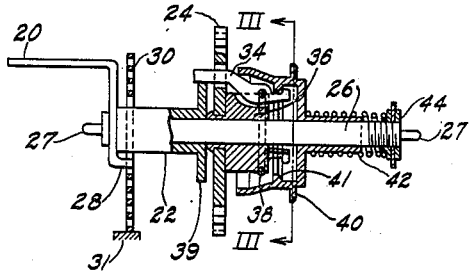
Fig. 2.
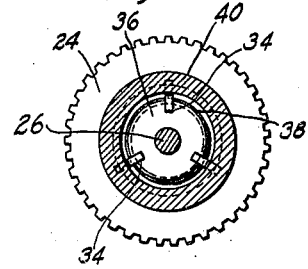
Fig. 3.
Fig. 4.　　Fig. 5.
WITNESSES:
Leo M. Garman
Wm. C. Groome
INVENTOR
George W. Rosenberger.
BY
ATTORNEY Patented Sept. 2, 1941

2,254,912

UNITED STATES PATENT OFFICE 2,254,912

WATT-HOUR DEMAND METER

George W. Rosenberger, Bloomfield, N. J., assignor to Westinghouse Electric & Manufacturing Company, East Pittsburgh, Pa., a corporation of Pennsylvania Application August 14, 1937, Serial No. 159,039

13 Claims. (Cl. 171—34)

The present invention relates to demand meters, and more particularly to a demand meter of the "block-interval" type which measures the maximum demand or consumption of electrical energy during periodically recurring intervals of time.

More specifically, the invention is an improvement in certain aspects of the watthour demand meter disclosed in United States Patent No. 2,047,376, issued July 14, 1936, to R. H. Lewis and G. W. Rosenberger.

In this class of apparatus it is usual for the watthour meter element to drive an actuating lever or dog which, in turn, pushes an indicating pointer over a dial in accordance with the demand of energy as measured by the meter. The driving lever or dog is periodically disconnected from the watthour meter by means of a timing mechanism which interrupts the driving connection between the dog and the meter, and the dog is returned to its zero position by a biasing spring or weight. The indicating pointer is maintained in its furthest advanced position by friction until reset at the end of the billing period, or other desired time.

The means by which the driving connection between the dog and meter is interrupted has usually taken the form of a mechanism for actually demeshing the gear connection, or of a friction clutch of various types. One type of clutch is disclosed in the aforesaid Lewis et al. application, and this invention is particularly concerned with improving the type of clutch so disclosed.

It is an object of the present invention to provide a clutch mechanism which is positive in establishing and releasing the driving connection between a meter element and a demand indicator which is simple and effective in construction, and in which the influence of atmospheric conditions is reduced to a minimum.

Further objects of the invention will be apparent from the following description and from the attached drawing in which:

Figure 1 is an exploded perspective view of a demand meter embodying the present invention;

Fig. 2 is an enlarged view, with parts in section, of a portion of the mechanism shown in Fig. 1;

Fig. 3 is a view in section taken on the line III—III of Fig. 2;

Fig. 4 is a view in front elevation of part of the mechanism shown in Fig. 2; and Fig. 5 is a view in side elevation of the part shown in Fig. 4.

The general assembly shown in Fig. 1 is quite similar to that shown in the aforementioned Lewis et al. patent, and includes a watthour meter, indicated by a rotatable disk 2 corresponding to the armature of a watthour meter of the induction disk type. The disk 2 drives through a shaft 3, and worm and worm wheel 5, a watthour integrating register indicated generally as 6. The register 6 is not shown completely, in the interest of clearness, but is of a usual type to operate the integrating pointers 8 in a well known manner.

The face 10 of the demand register is provided with a dial 11 around the periphery thereof for cooperation with a demand pointer 12 in a usual manner. The pointer 12 is pivoted at the center of the dial upon a shaft 13 journaled in a bracket (not shown) secured to the rear of the dial plate. The indicating pointer 12 is frictionally held against a non-rotatable stop 14 with a disk of resilient material therebetween, in a usual manner. A spring clip 16, also secured to the dial plate, biases the pointer and resilient disk together so that the pointer is maintained frictionally in any position to which it is moved.

The pointer 12 is advanced in accordance with watthour consumption by a dog 20 secured to a sleeve 22, the latter being driven by a gear 24 in driving connection with the integrating gear train 6 through pinion 25.

Referring to Fig. 2, the sleeve 22 is loosely mounted upon a shaft 26 having reduced end portions 27 for rotatably mounting the shaft on the structure of the register. The dog 20 is secured to the sleeve 22 for rotation therewith and has its inner end portion 28 secured to the inner end of a spiral spring 30, the outer end of which is fixed as at 31 to a stationary part of the register. The spring 30 biases the sleeve 22 with the dog 20 toward a zero position, such as provided by the notch 32 shown in Fig. 1.

The driving connection between the gear 24 and the sleeve 22 is effected by a clutch mechanism comprising a plurality of levers 34, preferably three in number, pivoted about the periphery of a grooved wheel 36. As shown more clearly in Fig. 5, the levers are provided with an aperture through which a spring ring 38 is threaded and snapped about the wheel 36 in the groove thereof. As shown in Fig. 4, the periphery of the wheel 36 is provided with three notches for receiving the ends of the levers.

The grooved wheel 36 is fixed to the shaft 26 in any desired manner and is rotatable with it.

It is disposed upon the shaft in such position that the free ends of the levers 34 overlie a laterally extending flange 39 on the inner end of the sleeve 22; the levers 34, as shown in Fig. 3, extending through slots in the gear 24. Preferably the gear 24 is rigidly secured to the shaft 26 although it need not be because the shaft may be driven by the engagement of the lever ends with the slots in the gear.

Normally the ends of the levers 34 loosely engage the periphery of the flange 39 and in order to effect a driving engagement between these elements it is necessary to move the free ends of the levers inwardly into intimate engagement with such periphery. This may be accomplished by an actuating member 40, of substantially cup-shape, loosely mounted on the shaft 26 and enclosing the portions of the levers on the right-hand side of the gear 24, as viewed in Fig. 2.

It will be noted that the confronting areas of the levers 34 and the inner surface of the actuating member 40 are so formed that as the member 40 is moved to the left (Fig. 2) a wedging action results which positively forces the free ends of the levers into engagement with the flange 39 of the sleeve 22. Further, the surfaces are so formed that as the member 40 is moved to the right a ridge or flange 41, on the inner surface thereof, tends to ride over the enlarged ends of the levers 34 on the opposite side of their pivots to thereby cause them to positively disengage the flange 39 to break the driving connection to the sleeve 22.

The actuating member 40 is biased toward the sleeve 22, or in a direction to effect the driving connection by means of a coil spring 42 encircling the shaft 26 and secured thereto by lock nuts 44. Normally, therefore, the sleeve 22 is driven by the gear 24 through the clutch mechanism.

In order to break the driving connection periodically a pivoted lever 46 (Fig. 1) is provided having one end in a position to engage the rear flange on the actuating member 40 and the opposite end controlled through a timing mechanism to rock the lever about its pivot points 48 to force the actuating member 40 to the right against the bias of the spring 42.

The timing mechanism includes a small synchronous motor 50 of any desired type which will maintain a synchronous or sub-synchronous speed, which operates through a train of reducing gears enclosed in an oil-tight casing 52. The output shaft of this gear train is connected through a train of gears 54 to a shaft 56 which drives a disk 58, upon the face of which is pivoted a lever 60.

A second set of gearing 62 is employed to drive sleeve 64, which is loosely mounted on the shaft 56 and which is provided at its lower extremity with a cam 66. The sleeve 64 is intended to operate at a substantially higher speed than the disk 58. For example, in a desired embodiment the sleeve operates twelve times as fast as the disk causing the engagement of the tip of cam 66 with the pivoted cam lever 60 twelve times during each revolution of the disk 58. At each engagement the long end of the lever is thrown outwardly and as the cam 66 again returns to a position to engage the lever it first hits the shorter end thereof causing the longer end to be in a position to engage the cam point.

The upper end of the actuating lever 46 is at such point in the rotation of the disk 58 that the cam 66 will strike the long end of the lever 60 and force the upper end of the lever 46 outwardly. This, in turn, moves the clutch actuating member 40 to the right, as viewed in Fig. 1, to disengage the levers 34 from the periphery of the flange 39 on the sleeve 22, thereby permitting the dog 20 to return to its zero position.

By the construction described the time of release of the clutch to permit the dog to return to zero is reduced to a minimum.

It is considered that the demand register or meter described is an improvement over those heretofore used, particularly with reference to the construction of the clutch in which the engaging clutch surfaces are of metal and therefore not subject to atmospheric conditions and the operation of the clutch members, both in making and breaking the driving connection, is quite positive thereby reducing the possibility of slipping and sticking.

Quite obviously modifications in the construction described are possible, and it is intended that the invention be limited only by the scope of the appended claims.

I claim as my invention:

1. A maximum demand measuring instrument comprising a demand member, means mounting said demand member for rotation away from an initial position, a shaft, means for rotating said shaft, and means for establishing a driving connection between said member and shaft for rotating said member away from said initial position including a lever pivotally mounted on said shaft for pivotal movement with respect thereto and having one end overlying a portion of said member, an actuating device mounted on said shaft for movement longitudinally thereof and having a portion extending over said lever, and means on confronting surfaces of said lever and actuating device to force said one end of the lever into engagement with said member when the device is moved toward the member.

2. A maximum demand measuring instrument comprising a demand member, means mounting said demand member for rotation away from an initial position, a shaft, means for rotating said shaft, and means for establishing a driving connection between said member and shaft for rotating said member away from said initial position including a lever pivotally mounted on said shaft for pivotal movement with respect thereto and having one end overlying a portion of said member, an actuating device mounted on said shaft for movement longitudinally thereof and having a portion extending over said lever, means on confronting surfaces of said lever and actuating device to force said one end of the lever into engagement with said member when the device is moved toward the member, and to move the lever out of such engagement when the device is moved in the opposite direction.

3. A maximum demand measuring instrument comprising a demand member, means mounting said demand member for rotation away from an initial position, a shaft, means for rotating said shaft, and means for establishing a driving connection between said member and shaft for rotating said member away from said initial position including a lever pivotally mounted on said shaft for pivotal movement with respect thereto and having one end overlying a portion of said member, an actuating device mounted on said shaft for movement longitudinally thereof and having a portion extending over said lever, means on confronting surfaces of said lever and actuating device to force said one end of the lever into engagement with said member when the device is moved toward the member, and resilient means for biasing said device toward said member.

4. A maximum demand measuring instrument comprising a demand member, means mounting said demand member for rotation away from an initial position, a shaft, means for rotating said shaft, and means for establishing a driving connection between said member and shaft for rotating said member away from said initial position including a plurality of levers distributed circumferentially of said shaft and means for pivoting them for movement radially thereof, said levers each being pivoted intermediate its ends with a free end thereof extending over said member, an actuating device mounted on said shaft for movement axially thereof and having a portion enclosing said levers on both sides of the pivot points thereof, and means effective on movement of said device toward said member for forcing said free ends of said levers into engagement with said member to establish a frictional driving connection therebetween.

5. A maximum demand measuring instrument comprising a demand member, means mounting said demand member for rotation away from an initial position, a shaft, means for rotating said shaft, and means for establishing a driving connection between said member and shaft for rotating said member away from said initial position including a plurality of levers distributed circumferentially of said shaft and means for pivoting them for movement radially thereof, said levers each having a free end extending over said member, an actuating device mounted on said shaft for movement axially thereof and having a portion overlying said levers and means effective on movement of said device toward said member for forcing said free ends of said levers into engagement with said member to establish a frictional driving connection therebetween, said means including cam surfaces of the confronting surfaces of said device and levers.

6. A maximum demand measuring instrument comprising a demand member, means mounting said demand member for rotation away from an initial position, a shaft, means for rotating said shaft, and means for establishing a driving connection between said member and shaft for rotating said member away from said initial position, including a plurality of levers distributed circumferentially of said shaft and means for pivoting them for movement radially thereof, said levers each having a free end extending over said member, an actuating device mounted on said shaft for movement axially thereof and having a portion enclosing said levers on both sides of the pivot points thereof, means effective on movement of said device toward said member for forcing the free ends of said levers into engagement with said member to establish a frictional driving connection therebetween, said means including cam surfaces on the confronting surfaces of said device and levers, and resilient means for biasing said device in such direction.

7. A maximum demand measuring instrument comprising a demand member, means mounting said demand member for rotation away from an initial position, a shaft, means for rotating said shaft, and means for establishing a driving connection between said member and shaft for rotating said member away from said initial position including a plurality of levers distributed circumferentially of said shaft and means for pivoting them for movement radially thereof, said levers each having a free end extending over said member, an actuating device mounted on said shaft for movement axially thereof and having a portion enclosing said levers on both sides of the pivot points thereof, and means effective on movement of said device toward said member for forcing said free ends of the levers into engagement with said member to establish a frictional driving connection therebetween, said means including confronting cam surfaces on said device and levers, resilient means for biasing said device in such direction, and an additional cam surface on said device for engaging the lever ends on the side of the pivot points thereof opposite to said free ends for raising the free ends of the levers away from said member upon movement of said device in the opposite direction.

8. In an instrument, a pair of rotatable members, and means for coupling said members including a spring ring, a lever pivotally mounted on said spring ring and movable into and out of contact with one of said members, said spring ring being positioned in a groove provided on one of said members.

9. A maximum demand measuring instrument comprising a demand member, means mounting said demand member for actuation away from an initial position, and means for actuating said demand member away from said initial position at predetermined intervals including a shaft member, a device pivotally carried by a first one of said members, and resiliently actuated means acting longitudinally of said shaft member for releasably engaging said device to force it into frictional driving engagement with a second one of said members.

10. A maximum demand measuring instrument comprising a demand member, means mounting said demand member for actuation away from an initial position, and means for actuating said demand member away from said initial position at predetermined intervals including a shaft member, a device pivotally carried by a first one of said members, resiliently actuated means acting longitudinally of said shaft member for releasably engaging said device to force it into frictional driving engagement with a second one of said members, and means for releasing the frictional driving engagement between said members at the end of each of said intervals.

11. In a coupling mechanism for an instrument having a driving element and a driven element, a gear member for transmitting energy between said elements, means mounting said gear member for rotation about a predetermined axis of rotation, a second member mounted for rotation about said predetermined axis of rotation, and means for intermittently coupling said members comprising a coupling device having a first portion positioned for frictional engagement with said second member on a first side of said gear member, and having a second portion on a second side of said gear member for controlling the operation of said coupling device, and means operable for releasably actuating said coupling device relative to said gear member into frictional driving engagement with said second member.

12. In a coupling mechanism for an instrument having a driving element and a driven element, a gear member for transmitting energy between said elements, said gear member having an opening extending axially therethrough, means mounting said gear member for rotation about a predetermined axis of rotation, a second member mounted for rotation about said predetermined axis of rotation, and means for intermittently coupling said members comprising a coupling device extending through said opening, said coupling device having a first portion positioned for frictional engagement with said second member on a first side of said gear member, and having a second portion on a second side of said gear member for controlling the operation of said coupling device, and cam means operable for exerting a force on said second portion, said force being transmitted through said opening in said gear member by said coupling device for urging said first portion of said coupling device into frictional driving engagement with said second member.

13. In a coupling for a demand meter having a member and an element both mounted for independent rotation about a common axis of rotation, means for establishing a driving connection between said member and element including a plurality of levers spaced around said axis of rotation, said levers each being pivotally mounted on said element for pivotal movement relative thereto, and each of said levers having a free end extending over said member, an actuating device having a portion overlying said levers, means effective on movement of said actuating device for forcing said free ends of said levers into engagement with said member to establish a frictional driving connection therebetween, said means including cam surfaces on the confronting areas of said portion of said device and said levers, and means for constraining said actuating device for movement into uniform engagement with all of said levers.

GEORGE W. ROSENBERGER.